(12) United States Patent
Nash

(10) Patent No.: US 11,241,136 B2
(45) Date of Patent: Feb. 8, 2022

(54) METHOD AND APPARATUS FOR CLEANING/SCRAPING METAL GRATES ON A GRILL

(71) Applicant: Timothy S. Nash, Naples, FL (US)

(72) Inventor: Timothy S. Nash, Naples, FL (US)

( * ) Notice: Subject to any disclaimer, the term of this patent is extended or adjusted under 35 U.S.C. 154(b) by 31 days.

(21) Appl. No.: 16/119,937

(22) Filed: Aug. 31, 2018

(65) Prior Publication Data

US 2020/0070212 A1    Mar. 5, 2020

(51) Int. Cl.
| | |
|---|---|
| A47L 13/08 | (2006.01) |
| A47J 37/07 | (2006.01) |
| A47L 17/06 | (2006.01) |
| A47J 43/28 | (2006.01) |
| B08B 1/00 | (2006.01) |

(52) U.S. Cl.
CPC ........... *A47L 13/08* (2013.01); *A47J 37/0786* (2013.01); *A47J 43/288* (2013.01); *A47L 17/06* (2013.01); *B08B 1/005* (2013.01)

(58) Field of Classification Search
CPC ........ A47L 13/02; A47L 13/022; A47L 13/08; A47L 13/34; A47L 13/12; A47L 17/06; A47J 37/0786; A47J 43/288; A47J 37/07; A46B 5/0008; A46B 5/0012; A46B 9/026; B08B 1/005
USPC ...... 15/236.01, 236.05, 159.1–160; 301/169; D32/49, 46; 30/169
See application file for complete search history.

(56) References Cited

U.S. PATENT DOCUMENTS

| | | | | |
|---|---|---|---|---|
| 2,677,840 | A * | 5/1954 | Morton | A46B 3/18 15/160 |
| D234,743 | S * | 4/1975 | Andersen | D32/49 |
| D258,111 | S * | 2/1981 | Christen, Jr. | B44D 3/162 D32/49 |
| 5,987,693 | A * | 11/1999 | Noga | A47J 47/00 15/236.07 |
| 6,643,888 | B2 * | 11/2003 | Griffith | A47L 13/08 15/236.06 |
| 10,286,423 | B1 * | 5/2019 | Armetta | B08B 1/005 |
| 2005/0011029 | A1 * | 1/2005 | Yu | A47L 13/12 15/111 |
| 2019/0282033 | A1 * | 9/2019 | Weinberger | B08B 1/005 |

* cited by examiner

*Primary Examiner* — Laura C Guidotti
(74) *Attorney, Agent, or Firm* — Lyman Smith; Patent Service Associates Inc.

(57) ABSTRACT

A hardened or flexible tool created for cleaning, removing debris, preventing brush debris from being left on a surface, preventing flare ups and fires for all users of grate(s) with particular application to grates being used in grills, can be formed from a hardened material for the added cleaning ability and safety for all users of grill grates, grates, grills or the like. The handle may be of any material, shape, size, color, holes, indentions or composition and may or may not be attached by chemical bond, friction fit, snap fit, bolt on, or the like. The molding/forming, stamping, cutting creation of the device can include but is not limited to laser cutting, water jetting, molding, forming and stamping. The device can be formed from a composition which may include, but is not limited to steel, stainless steel, metal, plastic, wood, rubber, plastic and synthetics.

6 Claims, 3 Drawing Sheets

METHOD AND APPARATUS FOR CLEANING/SCRAPING METAL GRATES ON A GRILL

BACKGROUND OF THE INVENTION

1. Field of the Invention

The present invention relates to various methods and devices for removing debris, scraping, cleaning, brushing from the top, bottom and in-between the grates on a grill, where the device has the ability to clean and remove said debris in any area. The device can clean/remove debris by contacting any area on the top, in-between and underneath any grill grate without requiring the user to move or remove the grill grates, thus providing the ability to clean multiple faces of a grill grate, even when hot.

2. Description of Prior Art and Related Information

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Grill grates on the top, bottom and in-between all peel, create rust deposits, and hold food. Many grill gates, such as typical and frequently used to cook food, also leave cooked food in crevices and on the underneath side potentially causing fires and flare ups. Grill grates vary based on the material they are made out of, size of the grates, spacing of the grates and for which purpose they are used for such as grilling, BBQing, cooking, smoking or warming food. Food and material gets caught in-between, on top, in crevices and underneath making it very hard to clean with a traditional brush.

Grill cleaning devices such as brushes and scrapers, are in many cases twisted steel, steel wire, nylon, steel pad, steel wool, wood, scrubber pad and even stone both one-sided and those with multiple sides. These brushes all claim to clean the surface and in-between the grates but none do a great job. In the case of wire brushes of all varieties, the wire gets full of debris quickly rendering them effectively useless and the wires come loose and detach which is a health hazard widely recognized. In the case of wood brushes, they are not able to remove much of the debris on the grill grates and can't effectively remove debris in the crevices and between the grates. All of the brushes are meant for cleaning the top side of the grates. Many claim to clean in-between the grates however do a poor job of it. There are no brushes for cleaning the bottom of the grate without having to move or handle the grate. Some brushes melt from the heat of the grill rendering them useless.

As can be seen, there is a need for improvement that can effectively clean the top side, remove debris effectively, clean the sides and crevices plus underneath on the bottom side of the grates and not be a health hazard in doing so from brush debris being left behind.

SUMMARY OF THE INVENTION

The present invention provides composition and functionality for the full and proper cleaning of grill grates, added safety by removing debris that causes flare ups, added safety by not allowing brush material to be left on the grates, full grate cleaning, and more efficient application as it relates to debris removal. The grill grate cleaning device, according to embodiments of the present invention, can clean the grate tops, crevices and bottoms without having to reposition the grates to do so. The device is extremely functional in that a user does not have to take their grill apart to clean the different sides/crevices of the grates.

An embodiment of the present invention provides a double T shaped head of the brush/scraper slim enough to provide the ability to fit in-between the grates, crevices and underneath/bottom side of the grill grates to fully clean the grates.

Another embodiment of the present invention provides a method of adding bristles or other material to the brush comprising all or a part of the brush.

These and other features, aspects and advantages of the present invention will become better understood with reference to the following drawings, descriptions and claims.

BRIEF DESCRIPTION OF THE DRAWINGS

Some embodiments of the present invention are illustrated as an example and are not limited by the figures of the accompanying drawings, in which like references may indicate similar elements.

Figure 1:
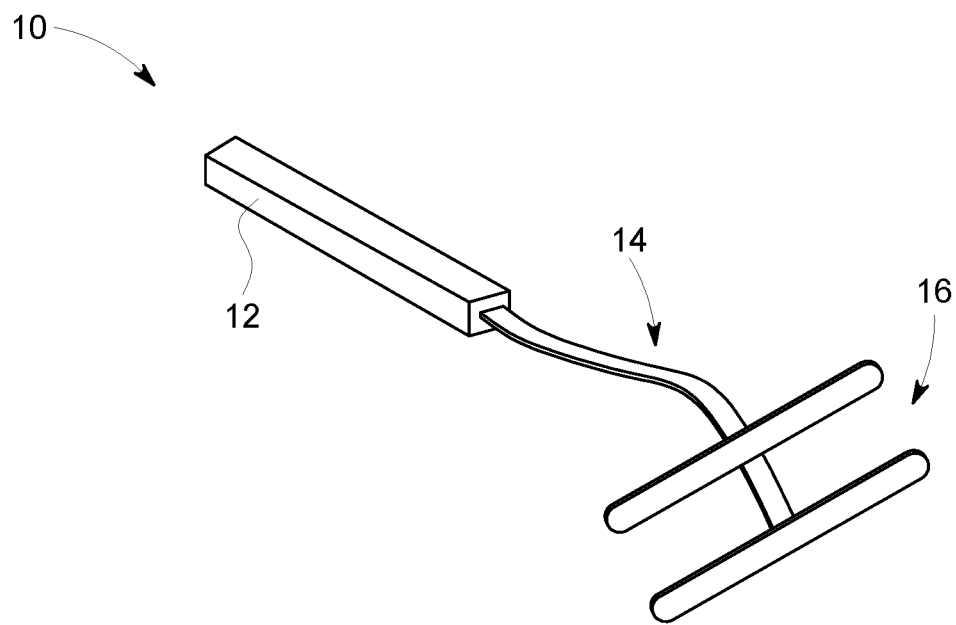
FIG. 1 illustrates a perspective view of a grill brush according to an exemplary embodiment of the present invention.
Figure 2:
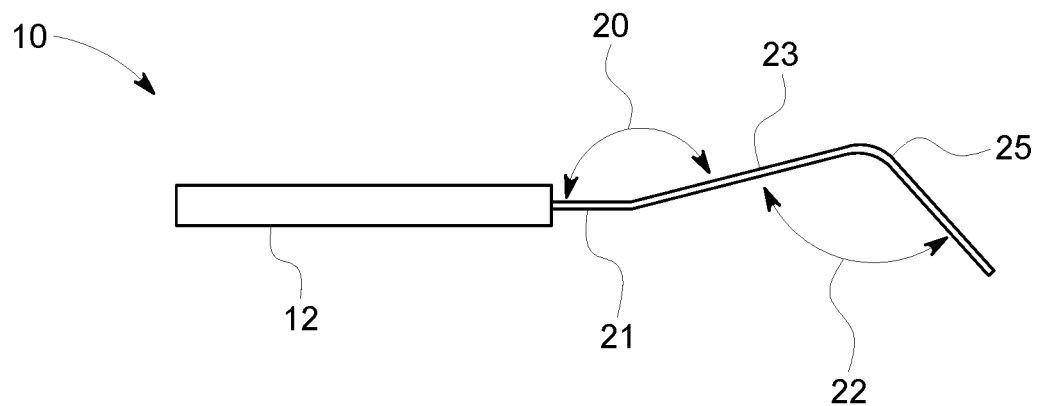
FIG. 2 illustrates a side view of the grill brush of FIG. 1.
Figure 3:
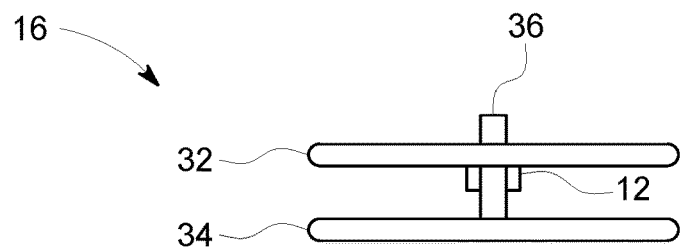
FIG. 3 illustrates a front view of the grill brush of FIG. 1.
Figure 4:
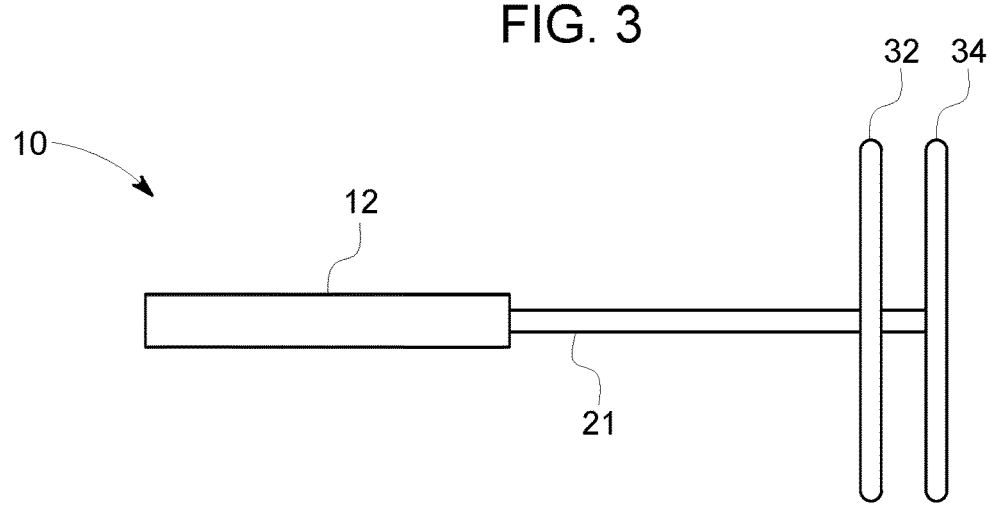
FIG. 4 illustrates a top view of the grill brush of FIG. 1.
Figure 5:
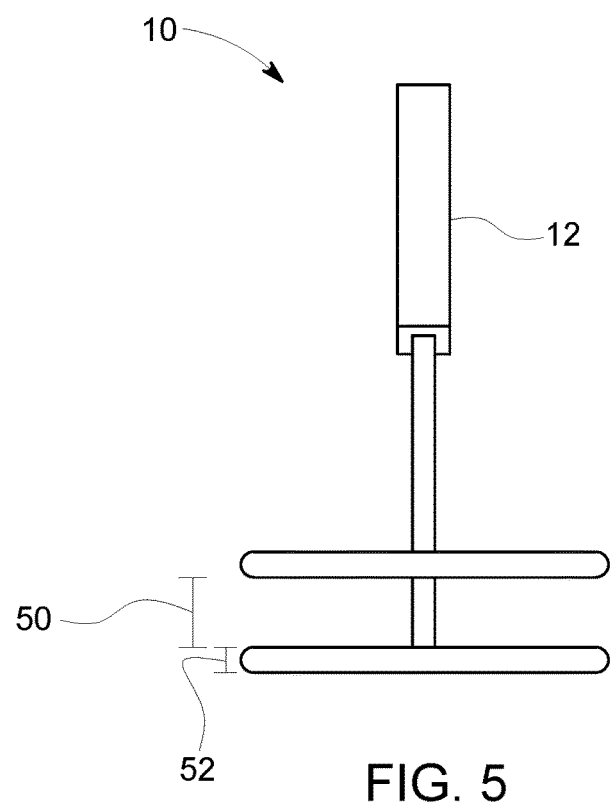
FIG. 5 illustrates a top perspective view of the grill brush of FIG. 1.

Unless otherwise indicated illustrations in the figures are not necessarily drawn to scale.

The invention and its various embodiments can now be better understood by turning to the following detailed description wherein illustrated embodiments are described. It is to be expressly understood that the illustrated embodiments are set forth as examples and not by way of limitations on the invention as ultimately defined in the claims.

DETAILED DESCRIPTION OF THE PREFERRED EMBODIMENTS AND BEST MODE OF INVENTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention, and is not intended to limit the invention to the specific embodiments illustrated by the figures or description below.

As is well known to those skilled in the art, many careful considerations and compromises typically must be made when designing for the optimal configuration of a commercial implementation of any system, and in particular, the embodiments of the present invention. A commercial implementation in accordance with the spirit and teachings of the present invention may be configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

Broadly, an embodiment of the present invention provides a hardened material created for the added cleaning ability and safety for all users of grill grates, grates, grills or the like. The composition of device, according to aspects of the present invention, can vary in flexibility, hardness, color, length, composition, metal, grade of metal, shape, angles, holes, indentions or size and may or may not have a handle. The handle may be of any material, shape, size, color, holes, indentions or composition and may or may not be attached by chemical bond, friction fit, snap fit, bolt on, weld, or the like. The molding/forming, stamping, cutting creation of the device can include but is not limited to laser cutting, water jetting, molding, welding, forming and stamping. The device can be formed from a composition which may include, but is not limited to steel, stainless steel, metal, plastic, wood, rubber, plastic and synthetics.

As used herein, the terms, "Brush", "Scraper", "Cleaner", "Scrubber" and "Tool" are used interchangeably herein to refer to any tool designed for cleaning, scraping, or brushing grill grates.

Referring now to FIGS. 1 through 5, embodiments of the present invention provide a cleaning tool 10 (also referred to as brush/scraper 10) to clean grill grates. The brush/scraper 10 may clean all or a portion of grill grates. When being used for the top portion (top) of the grate(s), it may remove debris partially or in its entirety. When cleaning in-between grate(s) and crevices, it may remove debris partially or in its entirety. When cleaning the bottom portion or bottom side of the grate(s), it may remove debris partially or in its entirety. The brush/scraper 10 may or may not have a handle 12. In some embodiments, as shown in FIGS. 1 through 5, the brush/scraper 10 may have a double T shape on the head 16 or anywhere on the brush/scraper 10.

The brush/scraper 10 may have a central member 14 extending generally in a direction away from a handle 12. A first extension 32 may extend, typically at a right angle, from one or both sides of the central member 14. A second extension 34 may extend, typically at a right angle, from one or both sides of the central member 14, distal of the first extension (relative to the handle 12), typically near an end of the central member 14. While the Figures show the extensions 32, 34 on both sides of the central member 14, as described above, the extensions 32, 34 may extend only from one side thereof. There are no limitations as to the shape being a double T shape, however the brush/scraper 10 may have the ability to clean the top, in-between, crevices and bottom of the grate(s) when fitting about a portion thereof.

In some embodiments, the brush/scraper 10 may be angled or straight with edges that may be straight or angled. In other embodiments, the brush/scraper 10 may be provided as a single integral unit or multiple pieces. The dimensions of the brush/scraper 10 may vary according to intended use. For example, the central member 14 can include a first portion 21 that may extend away from the handle 12. In some embodiments, the first portion 21 may be generally parallel to a longitudinal axis of the handle 12. A first bend 20 in the central member 14, distal the handle 12, may vary from about 180 degrees to about 140 degrees, typically about 170 degrees to 160 degrees. A second portion 23 of the central member 14 can extend from the first bend 20 to a second bend 22 in the central member 14, distal the first bend 20 (relative to the handle 12). The second bend 22 may be in a direction opposite the first bend 20 and may be from about 100 to about 140 degrees, typically from about 110 to about 125 degrees.

In some embodiments, the brush/scraper 10 may be designed to include a base portion or handle 12. In some embodiments, the base portion or handle 12 can frictionally fit onto the end of the central member 14, thereby securing the handle 12 thereto. In some embodiments, the end of the central member 14 may fit into or onto the handle 12, thereby securing the central member 14 to the handle 12. In still other embodiments, the handle 12 may be formed integrally with the central member 14. The handle 12 may be useful for gripping, holding, stabilizing and using the brush/scraper 10. Regardless of the method of attachment to the central member 14, the handle 12 may prevent direct contact between the user and the central member 14 and the extensions 32, 34.

The brush/scraper 10 may have a width of 1/64 of an inch to about 4 inches, for example, where the brush/scraper can clean the grate(s), including but not limited to the top, in-between, crevices, and bottom of the grate(s).

The handle 12 may have a length of 0 to 12 inches and may have a width of 0 to 4 inches. The width may provide a wider surface upon which the central member 14 can be held, used or stabilized.

Referring to FIGS. 1-5, various mechanisms may be included as integral components. In some embodiments, one or more handles 12 may be attached to the surface of the central member 14. The handle(s) or grip(s) may be attached to the brush/scraper by various methods such as friction fit, snap fit, bolt on, chemical bond, overmolding or the like.

Referring to FIGS. 1-5, the T-shaped design may be a T-shape or any other shape so long as it has the ability to clean the top, in-between, crevices or the bottom of the grate(s) without having to handle, move or change the position of the grate(s). The T-shaped head may have an angle of 0 degrees or as much as 360 degrees.

Referring to FIGS. 1-5, the shaft, or neck of the brush/scraper, may be bent from 0 degrees or 360 degrees.

Referring to FIGS. 1-5, the brush/scraper may be one single unit or have attachments. For example, while the figures show the extensions 32, 34 as flat members, their surface may be textured, may include projections, may include brush-like material, or the like. Similarly, the central member 14 may be similarly designed. While the figures show the central member 14 and the extensions 32, 34 as flattened, solid members, they may be rounded, include holes therethrough, or the like.

By removing the debris from grate(s), like food, grit, rust, or carbon, flare ups and fires may be minimized. By using a brush/scraper without bristles/brushes, safety may be enhanced by not leaving debris on the grate(s) for consumption in, on, or among food or material.

Figure 6:
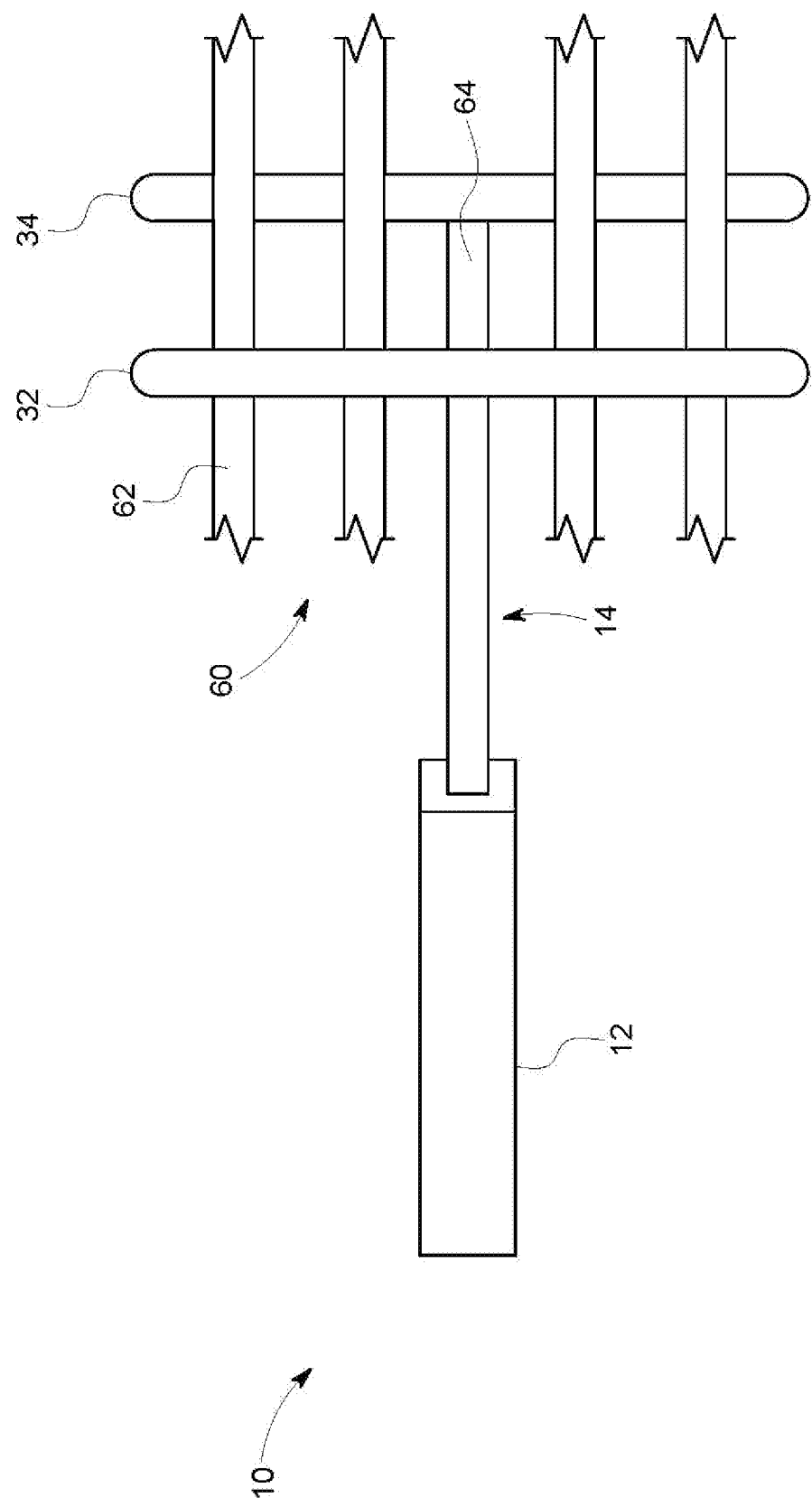
FIG. 6 illustrates an exemplary use of the grill brush of FIG. 1 on a grate of a grill.

FIG. 6 illustrates one exemplary embodiment showing the use of the scraper/brush 10. In this embodiment, the first extension 32 may be positioned above the rung 62 of the grate 60, while the second, distal extension 34 may be positioned below the rung 62 of the grate 60. As can be seen, a user may move the scraper/brush 10 along the grate 60 to contact both a top side 62 and a bottom side of the grate 60. The user may move the scraper/brush 10 to one side to cause the extension connecting member 64 to contact sides of the rungs 62 of the grate 60. Then, while moving the scraper/brush 10 parallel to the rungs 62, a user may contact three sides of the rung 62 simultaneously. Of course, other modes of operation are contemplated within the scope of the present invention. For example, a user may insert the space 50 between the extensions 32, 34 on either side of a rung and move the scraper/brush 10 along a length of the rung to clean both sides thereof at the same time.

The brush/scraper may be formed in various shapes. While the Figures show a double T-shape, the brush/scraper may be formed in other shapes to clean the top, bottom, in-between or crevices of grate(s). The brush/scraper may also be formed of various materials. In one embodiment, the brush/scraper may be formed from a material of 316 Stainless Steel, for example. Regardless of material, in typical embodiments, the brush/scraper can be made from metal, plastic or any material. The brush/scraper may optionally include one or more components. For example, one or more surfaces may be created plus one or more handles included therein. In some embodiments, a piece of metal may be disposed in all or a portion of the handle so that the handle contacts the brush/scraper when the brush/scraper is disposed therein.

It should be understood, of course, that the foregoing relates to exemplary embodiments of the invention and that modifications may be made without departing from the spirit and scope of the invention as set forth in the following claims.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

Many alterations and modifications may be made by those having ordinary skill in the art without departing from the spirit and scope of the invention. Therefore, it must be understood that the illustrated embodiments have been set forth only for the purposes of examples and that they should not be taken as limiting the invention as defined by the following claims. For example, notwithstanding the fact that the elements of a claim are set forth below in a certain combination, it must be expressly understood that the invention includes other combinations of fewer, more or different ones of the disclosed elements.

The words used in this specification to describe the invention and its various embodiments are to be understood not only in the sense of their commonly defined meanings, but to include by special definition in this specification the generic structure, material or acts of which they represent a single species.

The definitions of the words or elements of the following claims are, therefore, defined in this specification to not only include the combination of elements which are literally set forth. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what incorporates the essential idea of the invention.

What is claimed is:

1. A grate cleaning tool comprising:
   a central member;
   a handle at one end of the central member; and
   a head portion consisting essentially of:
      a first flattened elongated member extending from opposite sides of the central member, a first distance from a distal end of the central member, at an angle from about 45 to about 135 degrees from the central member at each side thereof; and
      a second flattened elongated member extending from opposite sides of the central member, a second distance from the distal end of the central member, at an angle from about 45 to about 135 degrees from the central member at each side thereof the first distance being greater than the second distance, wherein
      the central member includes a first bend in a first direction and a second bend in a second direction opposite the first direction
      the first and second flattened elongated members form a double T-shaped head portion; and
      a first portion of the central member extends generally parallel with a longitudinal axis of the handle, the first bend raises the central member outside of the longitudinal axis of the handle and the second bend causes the central member to cross through the longitudinal axis of the handle.

2. The grate cleaning tool of claim 1, wherein a gap is present between the first and second flattened elongated members.

3. The grate cleaning tool of claim 1, wherein the first and second flattened elongated members are formed integrally with the central member.

4. The grate cleaning tool of claim 1, wherein the first bend is proximate the handle and the second bend is formed above a longitudinal axis of the handle.

5. A grate cleaning tool comprising:
a handle;
a central portion extending from the handle; and
a double T-shaped head formed at a distal end, relative the handle, of the central portion, the double T-shaped consisting essentially of first and second flattened elongated members positioned at first and second distances from a distal end of the central portion, respectively, that each extend from opposite sides of the central portion, wherein
the central portion includes a first bend in a first direction and a second bend in a second direction opposite the first direction; and
a first portion of the central portion extends generally parallel with a longitudinal axis of the handle, the first bend raises the central portion outside of the longitudinal axis of the handle and the second bend causes the central portion to cross through the longitudinal axis of the handle.

6. The grate cleaning tool of claim 5, wherein the central portion and double I-shaped head are formed integrally with each other.

* * * * *